United States Patent
Aziz et al.

(10) Patent No.: US 11,159,304 B2
(45) Date of Patent: Oct. 26, 2021

(54) CLOCK DATA RECOVERY MECHANISM

(71) Applicant: NVIDIA CORPORATION, Santa Clara, CA (US)

(72) Inventors: Pervez Mirza Aziz, Dallas, TX (US); Rohit Rathi, Milpitas, CA (US); Vishnu Balan, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/409,686

(22) Filed: May 10, 2019

(65) Prior Publication Data
US 2020/0358593 A1 Nov. 12, 2020

(51) Int. Cl.
*H04L 7/033* (2006.01)
*H04L 25/03* (2006.01)
*H04L 25/02* (2006.01)

(52) U.S. Cl.
CPC ........ *H04L 7/0334* (2013.01); *H04L 25/0256* (2013.01); *H04L 25/03057* (2013.01)

(58) Field of Classification Search
CPC ............... H04L 7/0334; H04L 25/0256; H04L 25/03057
See application file for complete search history.

(56) References Cited

U.S. PATENT DOCUMENTS

| | | | | |
|---|---|---|---|---|
| 4,805,190 A | * | 2/1989 | Jaffre | H04L 25/497 341/57 |
| 4,890,299 A | * | 12/1989 | Dolivo | G11B 20/10055 375/290 |
| RE34,206 E | * | 3/1993 | Sayar | H04L 7/0062 375/293 |
| 5,479,126 A | * | 12/1995 | Pan | H03L 7/0891 327/148 |
| 5,576,904 A | * | 11/1996 | Behrens | G11B 20/10009 360/51 |
| 6,216,148 B1 | * | 4/2001 | Moran | G11B 20/10009 708/3 |

(Continued)

OTHER PUBLICATIONS

R. Cideciyan et al., "A PRML system for digital magnetic recording," IEEE J. Select. Areas Commun., vol. 10, pp. 38-55, Jan. 1992.

(Continued)

*Primary Examiner* — Freshteh N Aghdam
(74) *Attorney, Agent, or Firm* — Artegis Law Group, LLP

(57) ABSTRACT

A clock data recovery (CDR) mechanism qualifies symbols received from the data detector prior to using those symbols to compute a timing gradient. The disclosed CDR mechanism analyzes one or more recently received symbols to determine whether the current symbol should be used in computing the time gradient. When configured with a Mueller-Muller phase detector, the timing gradient for the received signal is set to zero if the current symbol is a −2 or a +2 and the previous symbol is non-zero. Otherwise, the Mueller-Muller timing gradient is evaluated in the traditional manner. When configured with a minimum mean-squared error phase detector, the timing gradient for the received signal is set to zero if the previous symbol is non-zero. Otherwise, the minimum mean-squared error timing gradient is evaluated in the traditional manner.

21 Claims, 8 Drawing Sheets

(56) References Cited

U.S. PATENT DOCUMENTS

| | | | |
|---|---|---|---|
| 6,985,549 B1* | 1/2006 | Biracree | H04L 7/0004 |
| | | | 375/355 |
| 9,143,367 B2* | 9/2015 | Aziz | H04L 7/02 |
| 2010/0102888 A1* | 4/2010 | Edwards | H03L 7/10 |
| | | | 331/16 |
| 2015/0180642 A1* | 6/2015 | Hsieh | H04L 25/03057 |
| | | | 375/233 |
| 2016/0352557 A1* | 12/2016 | Liao | H04L 27/3809 |

OTHER PUBLICATIONS

J.D. Alexander, "Clock Recovery From Random Binary Signals", IEE Electronics Letters, 1975, vol. 11 No. 22.

P. Aziz and S. Surendran, "Symbol Rate Timing Recovery for Higher Order Partial Response Channels", IEEE Journal on Selected Areas in Communications, pp. 635-648, Apr. 2001.

K. Mueller, M. Muller, "Timing Recovery in Digital Synchronous Data Receivers", IEEE Transactions on Communications, pp. 516-531, May 1976.

\* cited by examiner

CLOCK DATA RECOVERY MECHANISM

BACKGROUND

Field of the Various Embodiments

Various embodiments relate generally to communications channel technology and, more specifically, to an improved clock data recovery mechanism.

Description of the Related Art

A conventional communication channel includes a transmitter that transmits an analog signal with a given signal frequency and a given signal phase across a communication link to a receiver. The analog signal represents digitally encoded data. The receiver includes a sampler that samples the analog signal with a given sampling frequency and a given sampling phase to generate signal samples. The receiver also includes a data detector that "slices" the signal samples to extract symbols associated with the digitally encoded data. The receiver further includes a clock data recovery (CDR) mechanism that adjusts the sampling frequency and/or sampling phase of the sampler to match the signal frequency and/or signal phase implemented by the transmitter. This approach allows the sampler to sample the analog signal at specific points in time where the received signal best represents the digitally encoded data.

One type of CDR mechanism includes a gradient calculator that resides downstream of the data detector and computes a timing gradient associated with the symbols output by the data detector. The timing gradient is then used to adjust the sampling frequency and/or sampling phase of the sampler. With this approach, the sampling frequency and/or sampling phase of the sampler can be accurately adjusted so long as the amplitude of the analog signal matches an expected amplitude. In many operating scenarios, however, the amplitude of the analog signal is initially indeterminate, which can be especially problematic in partial response system implementations. As is well known, in exemplary partial response system implementations (e.g. 1+D), three symbols from the analog signal (a −2, a 0, and a +2) can be decoded. Thus, in such partial response system implementations, without an accurate amplitude for the analog signal, the data detector cannot reliably determine whether a positive analog value represents a 0 or a +2 or whether a negative value represents a 0 or a −2. Accordingly, the CDR mechanism within a partial response system oftentimes receives incorrect symbol values from the data detector.

Without correct symbol values, the CDR mechanism cannot accurately compute the timing gradient that is used to adjust the sampling frequency and/or sampling phase of the sampler. Without the ability to quickly and accurately adjust the sampling frequency and/or sampling phase of the sampler, communication link acquisition can take longer, and, once acquired, the communication link may be less robust against various types of interference, including inter-symbol interference and duty-cycle distortion, among others.

As the foregoing illustrates, what is needed in the art is a more effective clock data recovery mechanism for partial response systems.

SUMMARY

Various embodiments include a computer-implemented method, including determining that a first symbol extracted from a communication link does not meet a reliability criterion, suppressing a first computation that generates a timing gradient associated with the first symbol, in response to suppressing the first computation, performing a first operation that generates the timing gradient associated with the first symbol, based on the timing gradient generated via the first operation, adjusting at least one parameter of an operation used to extract symbols from the communication link.

One technological advantage of the disclosed techniques relative to the prior art is that communication channel acquisition time can be reduced in partial response systems regardless of whether the target amplitude of the analog signal is predetermined in advance of communication channel acquisition. Accordingly, the communication channel can be used to transmit data sooner and therefore more effectively.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1A:
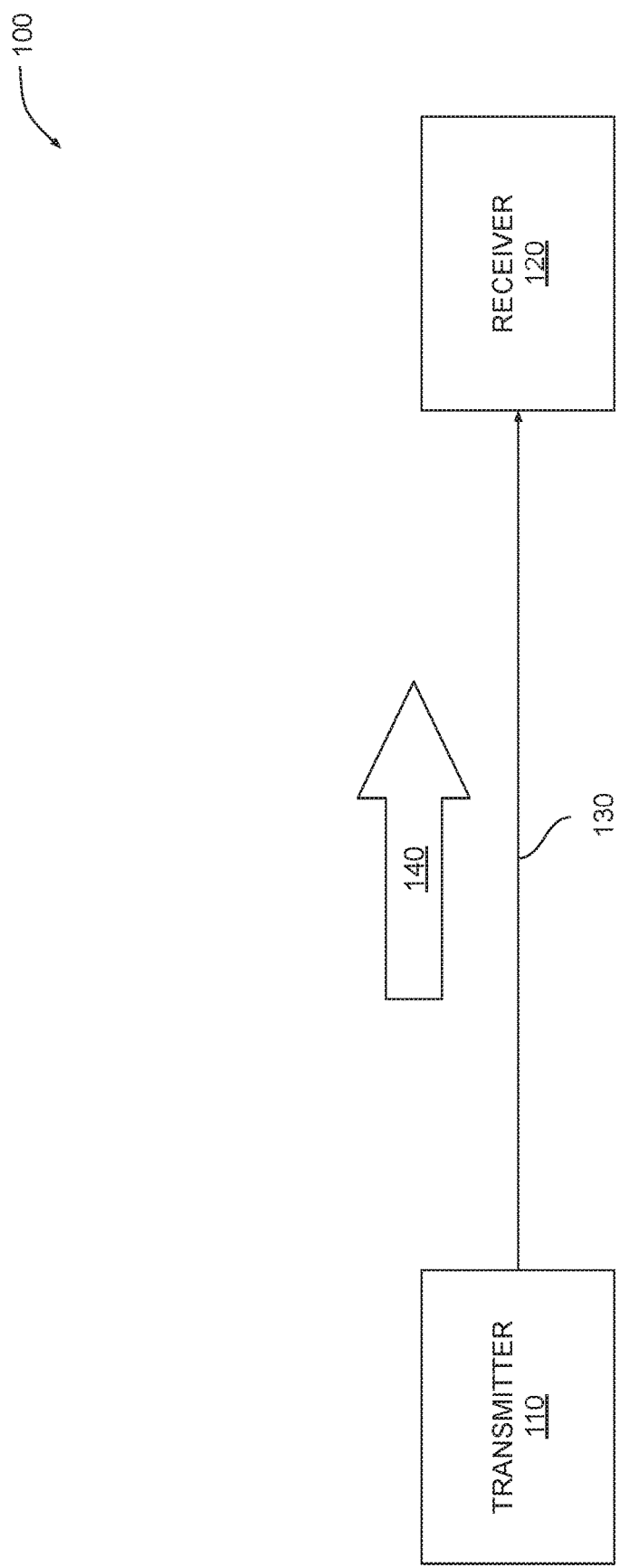
FIG. 1A illustrates a system configured to implement one or more aspects of the present embodiments.

In the following description, numerous specific details are set forth to provide a more thorough understanding of the various embodiments. However, it will be apparent to one skilled in the art that the inventive concepts may be practiced without one or more of these specific details.

As noted above, a conventional communication channel includes a transmitter that communicates with a receiver across a communication link. The transmitter transmits an analog signal with a given signal frequency and a given signal phase across the communication link to the receiver. The analog signal represents digitally encoded data. The receiver includes a sampler that samples the analog signal with a given sampling frequency and a given sampling phase to generate signal samples. The receiver also includes a data detector that "slices" the signal samples to extract symbols associated with the digitally encoded data. The receiver further includes a clock data recovery (CDR) mechanism that adjusts the sampling frequency and/or sampling phase of the sampler to match the signal frequency and/or signal phase implemented by the transmitter. This approach allows the sampler to sample the analog signal at specific points in time where the received signal best represents the digitally encoded data.

One type of CDR mechanism includes a phase detector or gradient calculator that resides downstream of the data detector and that computes a timing gradient associated with the symbols output by the data detector. The timing gradient is used to adjust the sampling frequency and/or sampling phase of the sampler. This approach allows accurate adjustment of the sampling frequency and/or sampling phase under circumstances where the amplitude of the analog signal matches a target amplitude. However, in a typical scenario, the target amplitude of the analog signal is initially unknown. This is especially problematic for exemplary partial response systems that can decode three values from the analog signal (a −2, a 0, and a +2). In particular, without an accurate target amplitude for the analog signal, the data detector within a partial response system cannot reliably determine whether a positive analog value represents a 0 or a +2 or whether a negative value represents a 0 or a −2.

Due to the above issue, the CDR mechanism within a partial response system sometimes receives incorrect symbol values from the data detector, which interferes with the ability of the CDR mechanism to accurately compute the timing gradient used to adjust the sampling frequency and/or sampling phase of the sampler. Without being able to quickly adjust the sampling frequency and/or sampling phase of the sampler to match the signal frequency and/or signal phase of the transmitter, respectively, link acquisition can take an extended period of time and, once acquired, the communication link may not be very robust against interference.

To address these issues, a CDR mechanism is disclosed that qualifies symbols received from the data detector prior to using those symbols to compute the timing gradient. In operation, the disclosed CDR mechanism analyzes one or more recently received symbols to determine whether the current symbol should be used in computing the time gradient. The CDR mechanism can implement two different approaches to qualifying symbols depending on the type of timing gradient calculation that is performed.

In the first approach, which is relevant to Mueller-Muller phase detectors, the timing gradient for the received signal is set to zero if the current symbol is a −2 or a +2 and the previous symbol is non-zero. Otherwise, the Mueller-Muller timing gradient is evaluated in the traditional manner, as known to those skilled in the art. In the second approach, which is relevant to minimum mean-squared error phase detectors, the timing gradient for the received signal is set to zero if the previous symbol is non-zero. Otherwise, the minimum mean-squared error timing gradient is evaluated in the traditional manner, as known to those skilled in the art.

In either of these techniques, the timing gradient is initially computed based only on zero-valued symbols, and is otherwise set to zero when non-zero symbols are detected. Zero-valued symbols are more likely to be correct than non-zero symbols regardless of the target amplitude of the analog signal because the analog signal should still approach or cross the zero axis to represent a zero-valued symbol. Accordingly, zero-valued symbols can provide a more accurate input to a timing gradient computation. As such, the disclosed techniques can improve the accuracy with which timing gradients are computed.

One technological advantage of the disclosed techniques relative to the prior art is that communication channel acquisition time can be reduced in partial response systems regardless of whether the target amplitude of the analog signal is predetermined in advance of communication channel acquisition. Accordingly, the communication channel can be used to transmit data sooner and therefore more effectively. Another technological advantage of the disclosed techniques is that the communication channel is more robust against various types of interference that can alter the phase and/or amplitude of the analog signal, including inter-symbol interference as well as duty-cycle distortion. These technological advantages represent one or more technological advancements relative to prior art approaches.

System Overview

FIG. 1A illustrates a system configured to implement one or more aspects of the present embodiments. As shown, a system 100 includes a transmitter 110 that is coupled to a receiver 120 by a communication channel 130. Communication channel 130 can be a wired or wireless communication channel and may include any technically feasible medium across which signals can be transmitted. For example, communication channel 130 could be a peripheral component interface express (PCIe) link, a radio frequency (RF) channel, a hard disk write mechanism, and so forth.

In operation, transmitter 110 transmits an analog signal 140 to receiver 120 with a given signal frequency and a given signal phase. Transmitter 210 may transmit analog signal 140 according to a partial response communication protocol. Accordingly, analog signal 140 can assume a range of values between a positive amplitude and a negative amplitude. Receiver 120 analyzes the values of analog signal 140 over time and then decodes these values into a set of symbols. In keeping with exemplary partial response system protocols, receiver 120 can decode a given value of analog signal 140 into a negative two (−2), a zero (0), or a positive two (+2), as described in greater detail below in conjunction with FIG. 1B.

Figure 1B:
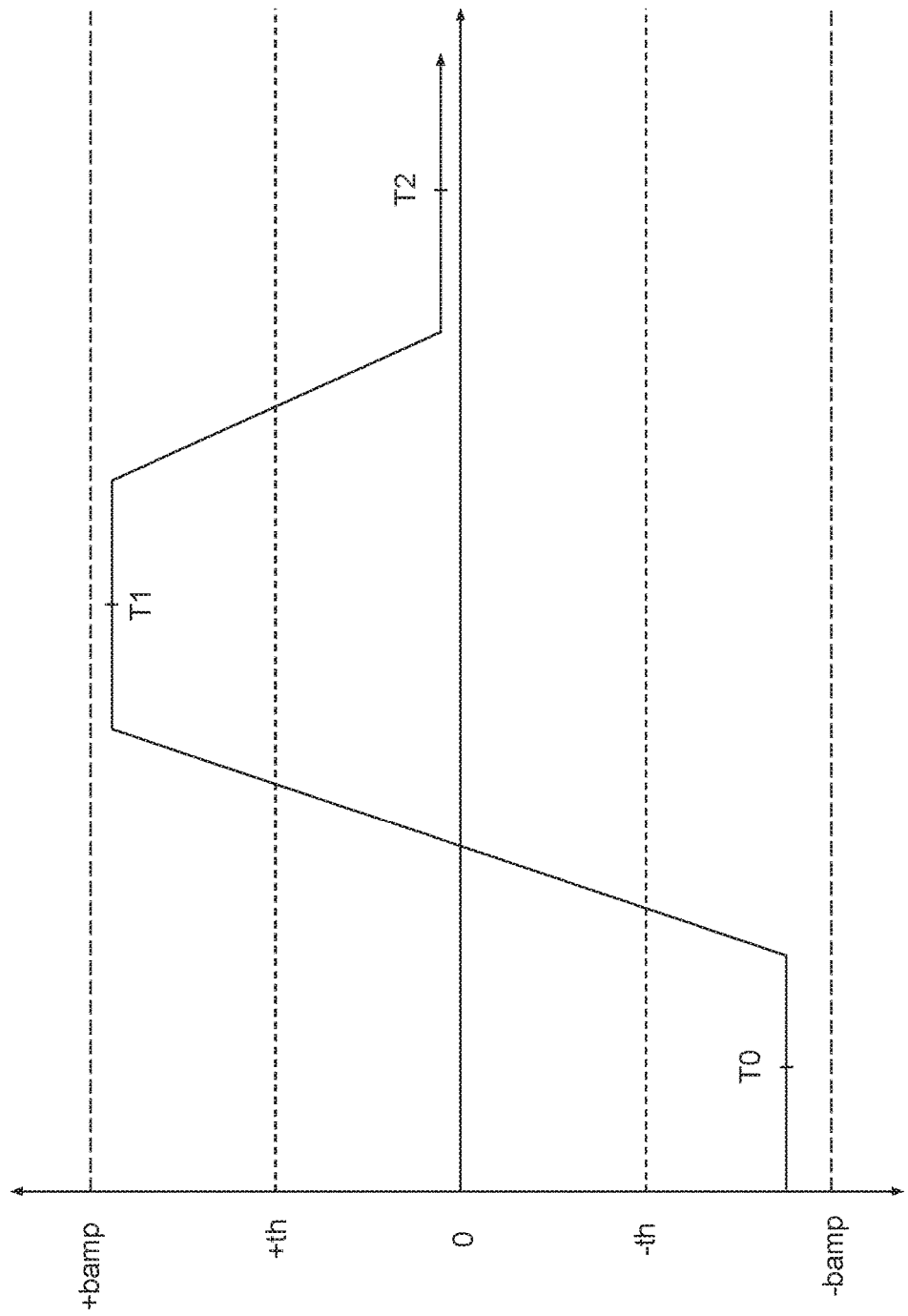
FIG. 1B is a graph of the analog signal of FIG. 1, according to various embodiments.

FIG. 1B is a graph of the analog signal of FIG. 1, according to various embodiments. In the example shown, analog signal 140 varies in amplitude over time between positive amplitudes and negative amplitudes. A positive amplitude value that is shown as +bamp corresponds to a target amplitude for representing a +2 symbol. An amplitude value of zero corresponds to a target amplitude value for representing a 0 symbol. A negative amplitude value that is shown as −bamp corresponds to a target amplitude value for representing a −2 symbol.

In operation, receiver 120 samples analog signal 140 at different points in time and then determines, based on threshold values +th and −th, whether the sampled values correspond to a −2, a 0, or a +2. In particular, receiver 120 determines that amplitudes that are less than −th correspond to a −2 and amplitudes that are greater than or equal to −th but less than or equal to +th correspond to a 0. Similarly, receiver 120 determines that amplitudes that are greater than +th correspond to a +2. In the example shown, receiver 120 would determine that an amplitude value sampled at time T0 corresponds to a −2, an amplitude value sampled at time T1 corresponds to a +2, and an amplitude value sampled at time T2 corresponds to a 0. In one embodiment, the values of −th and +th may be half the values of −bamp and +bamp, respectively.

In some operating scenarios, transmitter 110 transmits analog signal 140 with target values for −bamp and +bamp that are not communicated to receiver 120. Without the target values for −bamp and +bamp, receiver 120 may not accurately set initial values for −th and +th to permit the correct decoding of amplitude values into symbols. For example, without a target value for −bamp, receiver 120 may not accurately set the initial value of −th, and therefore may be unable to correctly determine whether a negative amplitude value corresponds to a −2 or a 0. Similarly, without a target value for +bamp, receiver 120 may not accurately set the initial value of +th, and therefore may be unable to correctly determine whether a positive amplitude value corresponds to a +2 or a 0.

For the above reasons, under initial operating conditions, receiver 120 may initially decode incorrect symbol values from analog signal 140. These incorrect symbol values can reduce how effectively receiver 120 establishes communications with transmitter 110. To address this issue, receiver 120 implements one or more techniques described in greater detail below in conjunction with FIGS. 2-4.

Receiver Configured for Partial Response Communication

Figure 2:
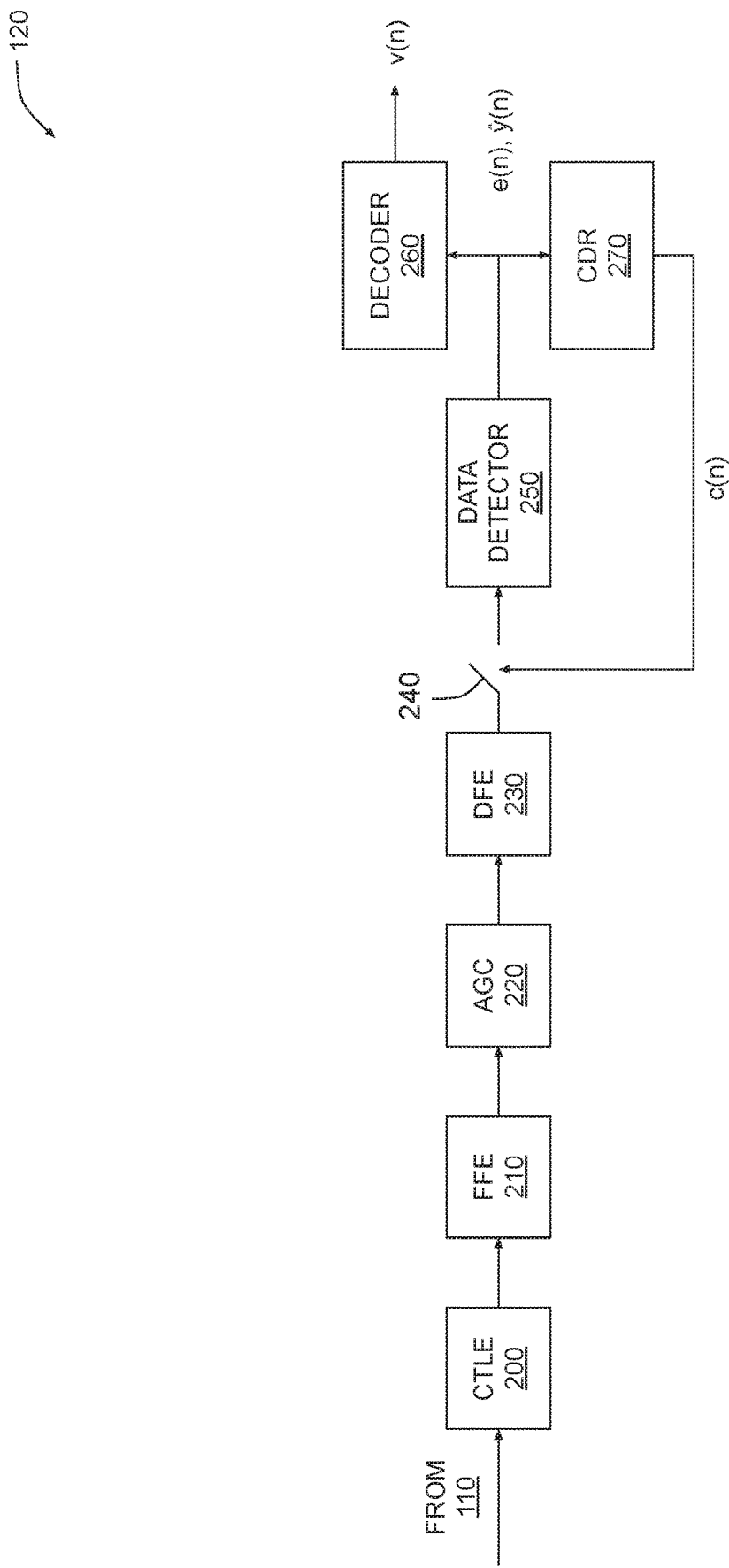
FIG. 2 is a more detailed illustration of the receiver of FIG. 1A, according to various embodiments.

FIG. 2 is a more detailed illustration of the receiver of FIG. 1A, according to various embodiments. As shown, receiver 120 includes a continuous time linear equalizer (CTLE) 200, a feed-forward equalizer (FFE) 210, an automatic gain control (AGC) 220, a decision feedback equalizer (DFE) 230, a sampler 240, a data detector 250, a decoder 260, and a clock data recovery (CDR) 270.

CTLE 200 receives analog signal 140 via communication channel 130 and implements a high-pass filter to amplify higher frequencies of analog signal 140 that may have been attenuated in transit. In various embodiments, CTLE 200 may be replaced with another type of equalizer, may be located elsewhere within receiver 120, or may be omitted entirely.

FFE 210 implements a finite impulse response (FIR) with a filtered signal received from CTLE 200. In various embodiments, FFE 210 may be replaced with another type of equalizer, may be located elsewhere within receiver 120, or may be omitted entirely.

AGC 220 provides additional gain to received signals and can be used to modify the amplitude of analog signal 140 (or a processed version thereof) to more closely approximate +bamp and/or −bamp. In so doing, AGC 220 may implement an internal feedback loop perform gain adjustments. In various embodiments, AGC 220 may be replaced with another type of gain adjustment block, may be located elsewhere within receiver 120, or may be omitted entirely.

DFE 230 operates as a data detector that implements a feedback loop to remove portions of received signals to increase the accuracy of subsequent decision estimates. In various embodiments, DFE 230 may be replaced with another type of equalizer, may be located elsewhere within receiver 120, or may be omitted entirely.

Sampler 240 is configured to sample analog signal 140 (or a processed version thereof) at a given sampling frequency and a given sampling phase to generate signal samples y(n). Signal samples y(n) are multi-bit resolution digital symbol values that are potentially subject to various "impairments." As referred to herein, the term "impairment" refers to interference and/or distortion that is introduced into analog signal 140 during transmission and that causes a mismatch between the signal frequency implemented by transmitter 110 and the sampling frequency implemented by sampler 240 and/or a mismatch between the signal phase implemented by transmitter 110 and the sampling phase implemented by sampler 240. Generally, these impairments can interfere with the decoding of correct symbol values. Sampler 240 outputs signal samples y(n) to data detector 250 to obtain decision estimates regarding the specific symbols encoded in signal samples y(n).

Data detector 250 performs an operation referred to in the art as "slicing" to interpret signal samples y(n) as discrete symbols. As described above in conjunction with FIG. 2A, in a partial response system, an analog signal varies between positive and negative amplitudes that can be interpreted, based on various thresholds, to communicate different symbols, including a −2, a 0, or a +2. Data detector 250 analyzes signal samples y(n) to generate decision estimates $\hat{y}(n)$ that can include these different symbols. Data detector 250 also generates error values e(n) based on the difference between signal samples y(n) and decision estimates $\hat{y}(n)$.

Decoder 260 performs a decoding operation based on decision estimates $\hat{y}(n)$, and possibly error values e(n) to generate data signal v(n). Data signal v(n) is a reconstructed version of the digitized data initially transmitted by transmitter 110. In one embodiment, decoder 260 transmits data signal v(n) to CDR 270.

CDR 270 is a timing module that analyzes, decision estimates $\hat{y}(n)$, error values e(n), and optionally data signal v(n) to generate a timing gradient c(n). CDR 270 then applies a filtered timing gradient c(n) to sampler 240 to adjust the sampling frequency and/or sampling phase of sampler 240. In so doing, CDR 270 causes the sampling frequency of sampler 240 to more closely approximate the signal frequency implemented by transmitter 110 and/or causes the sampling phase of sampler 240 to more closely approximate the signal phase implemented by transmitter 110. In this manner, CDR 270 improves the ability of sampler 240 to sample analog signal 140 (or a processed version thereof) at specific locations that best represent the digitized data transmitted by transmitter 110.

In addition, CDR 270 performs a symbol qualification operation during an initial period of communication channel acquisition in order generate more accurate timing gradients than those generated via conventional approaches, as described in greater detail below in conjunction with FIG. 3.

Clock Data Recovery Mechanism with Conditional Gradient Suppression

Figure 3:
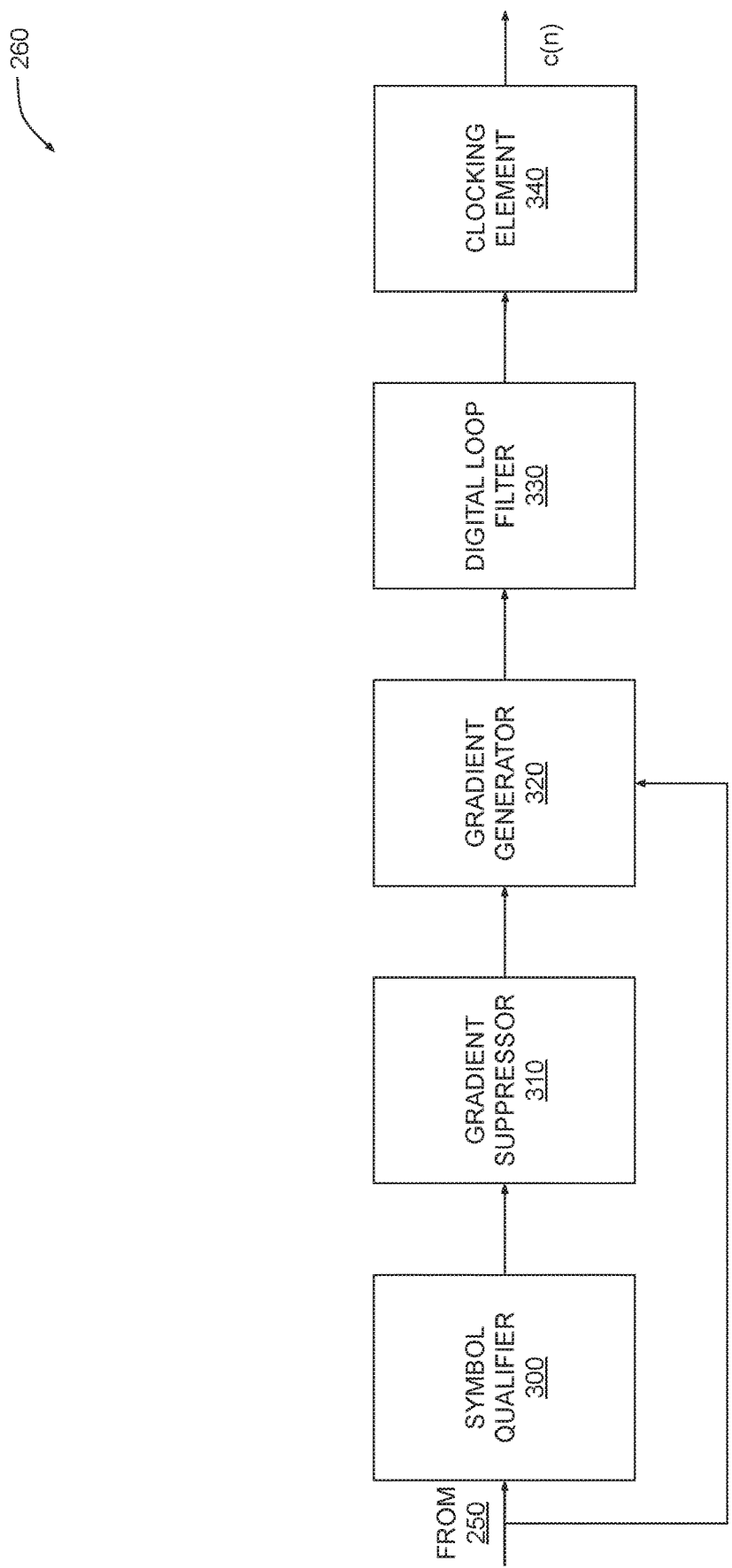
FIG. 3 is a more detailed illustration of the clock data recovery mechanism of FIG. 2, according to various embodiments.

FIG. 3 is a more detailed illustration of the clock data recovery mechanism of FIG. 2, according to various embodiments. As shown, CDR 270 includes a symbol qualifier 300, a gradient suppressor 310, a gradient generator 320, a digital loop filter 330, and a clocking element 340.

Persons familiar with CDR mechanisms will understand how gradient generator 320, digital loop filter 330, and clocking element 340 perform CDR operations. In particular, gradient generator 320 receives decision estimates $\hat{y}(n)$ and error values e(n) from data detector 250 and computes an initial timing gradient. Gradient generator 320 can implement the Mueller-Muller phase detector or a minimum mean-squared error phase detector, among others. Gradient generator 320 can also accumulate and/or average gradient values over time.

Gradient generator 320 transmits the initial timing gradient to digital loop filter 330 for various filtering and de-noising operations. Digital loop filter 330 transmits a filtered timing gradient to clocking element 340. Based on the filtered timing gradient, clocking element 340 applies filtered timing gradient c(n) to sampler 240 to adjust the sampling frequency and/or sampling phase implemented by sampler 240. However, as mentioned, under circumstances where symbols are erroneously decoded from analog signal 140 because the target amplitude of analog signal 140 is undetermined, the timing gradient may initially be incorrect.

To correct this problem, symbol qualifier 300 analyzes decision estimates ŷ(n) and under specific conditions causes gradient suppressor 310 to suppress the generation of a timing gradient based on those decision estimates ŷ(n) and to instead set the timing gradient to zero. Symbol qualifier 300 operates in two different modes of operation depending on whether gradient generator 320 implements the Mueller-Muller phase detector or the minimum mean-squared error phase detector.

When gradient generator 320 is configured to implement the Mueller-Muller phase detector, then gradient suppressor 310 sets the timing gradient to zero under the condition that the current decision estimate ŷ(n) and the previous decision estimate ŷ(n−1) are both non-zero. Under other conditions, gradient generator 320 computes the timing gradient using the standard Mueller-Muller phase detector. When gradient generator 320 is configured to implement the minimum mean squared error phase detector, then gradient suppressor 310 sets the timing gradient to zero under the condition that the previous decision estimate ŷ(n−1) is non-zero. Under other conditions, gradient generator 320 computes the timing gradient using the standard minimum mean-squared error phase detector.

The above approach advantageously avoids computing timing gradients when non-zero symbols are decoded, because those non-zero symbols can be erroneously decoded if the target amplitude values of +bamp and −bamp are undetermined. Timing gradients computed based on zero-valued symbols are more likely to be correct because, as mentioned, analog signal 140 crosses or approaches the zero axis to represent a 0 regardless of the target amplitude. When gradient generator 320 is configured to implement a minimum-mean squared error phase detector, the approach described above can also reduce CDR errors in the presence of duty-cycle distortion because the timing gradient is computed based on the previous error value and does not straddle a boundary between even and odd samples. Duty cycle distortion can cause differing impairments in odd and even samples. A timing gradient using both odd and even error samples can have excess impairment(s). However, the minimum mean squared gradient effectively uses only one of either odd or even error samples at a given time and thus can induce overall less error in the timing gradient computation. With symbol qualification, the Mueller-Muller timing gradient also effectively uses one error at a given time and may benefit from not including both error samples.

CDR 270 can deactivate symbol qualification and gradient suppression once one or more criteria are met. In particular, CDR 270 can deactivate symbol qualification and gradient suppression after a specific amount of channel acquisition time has elapsed. Further, CDR 270 can deactivate symbol qualification and gradient suppression once AGC 220 computes values for −bamp and +bamp. In addition, CDR 270 can reactivate symbol qualification and gradient suppression in order to re-acquire communication channel 130 on an as-needed basis. The techniques described thus far are described in greater detail below in conjunction with FIG. 4.

Figure 4:
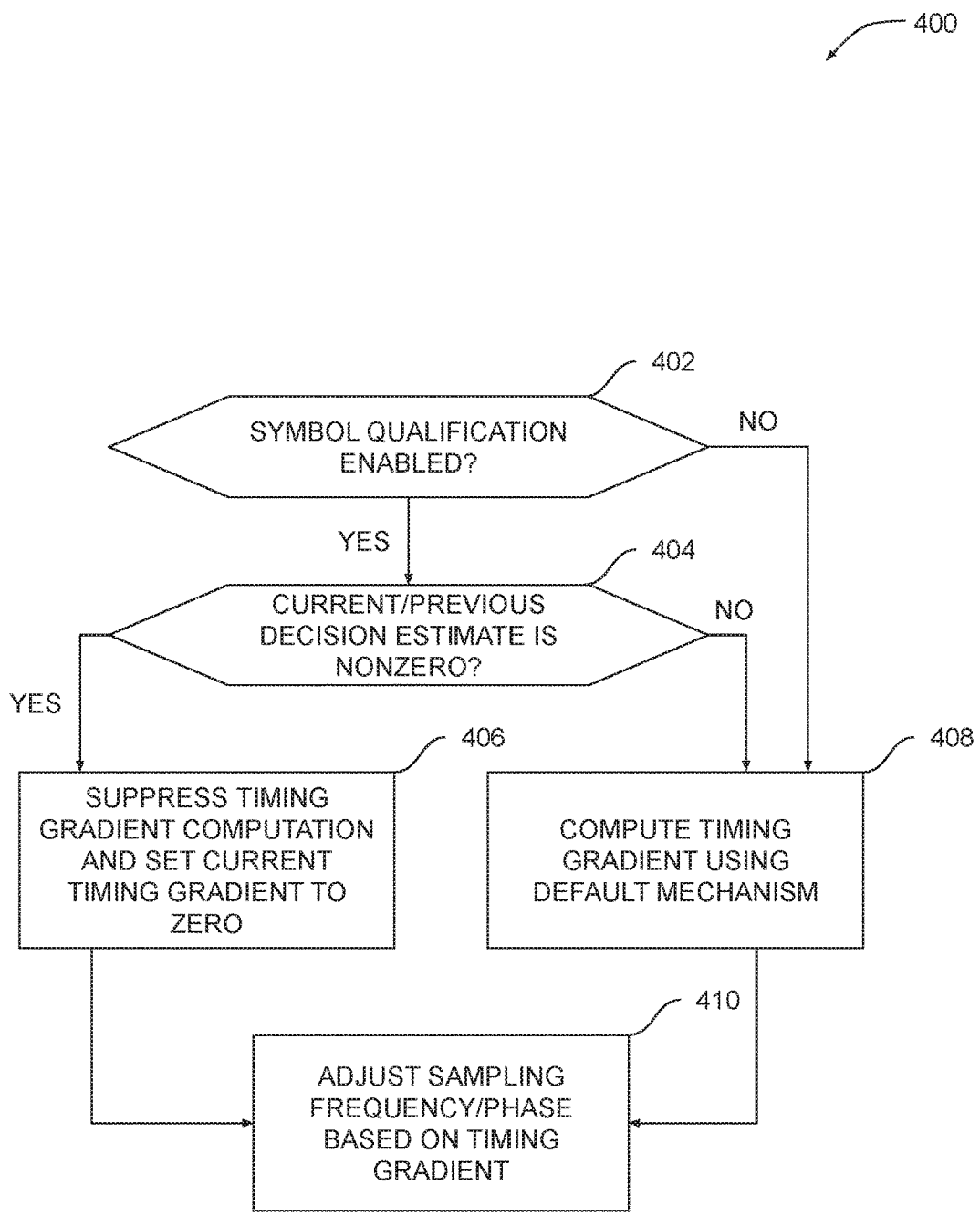
FIG. 4 is a flow diagram of method steps for conditionally suppressing a timing gradient calculation, according to various embodiments.

FIG. 4 is a flow diagram of method steps for conditionally suppressing a timing gradient calculation, according to various embodiments. Although the method steps are described in conjunction with the systems of FIGS. 1A-3, persons skilled in the art will understand that any system configured to perform the method steps in any order falls within the scope of the present embodiments.

As shown, a method 400 begins at step 402, where CDR 270 determines whether symbol qualification is enabled. Symbol qualification and corresponding gradient suppression can be active or inactive depending on various factors. CDR 270 can activate symbol qualification and gradient suppression during an initial channel acquisition period and then deactivate symbol qualification and gradient suppression subsequently. CDR 270 can also deactivate symbol qualification and gradient suppression once AGC 220 computes accurate values of −bamp and +bamp.

If CDR 270 determines at step 402 that symbol qualification is enabled, then the method 400 proceeds to step 404. At step 404, symbol qualifier 300 within CDR 270 analyzes a current decision estimate in conjunction with a previous decision estimate, or analyzes only a previous decision estimate, depending on the configuration of gradient generator 320, to determine whether the analyzed decision estimate(s) are non-zero. When gradient generator 320 is configured to implement the Mueller-Muller phase detector, then gradient suppressor 310 analyzes the current decision estimate ŷ(n) and the previous decision estimate ŷ(n−1). When gradient generator 320 is configured to implement the minimum mean squared error phase detector, then gradient suppressor 310 analyzes the previous decision estimate ŷ(n−1).

If symbol qualifier 300 determines at step 404 that the analyzed decision estimate(s) are non-zero, then the method 400 proceeds to step 406. As step 406, gradient suppressor 310 suppresses the computation of a timing gradient and sets the current timing gradient to zero. In doing so, gradient suppressor 310 can prevent the computation of incorrect timing gradients based on erroneous symbol estimates that can arise when the target amplitude of analog signal 140 is undetermined. At step 410, CDR 270 adjusts the sampling frequency and/or sampling phase of sampler 240 based on the current timing gradient. In this manner, CDR 270 can cause sampler 240 to sample analog signal 140 at precise times when analog signal 140 accurately represents digitized data.

If CDR 270 determines at step 402 that symbol qualification is not enabled, then the method 400 proceeds to step 410. At step 410, gradient generator 320 computes the current timing gradient using a default mechanism. The default mechanism can be a Mueller-Muller phase detector or a minimum mean-squared error phase detector, among others. In like fashion, at step 404, if symbol qualifier 300 determines that the decision estimate(s) analyzed at step 404 are non-zero, then the method 400 proceeds to step 410 and gradient generator 320 computes the current timing gradient using the default mechanism.

In sum, a CDR mechanism qualifies symbols received from the data detector prior to using those symbols to compute a timing gradient. The disclosed CDR mechanism analyzes one or more recently received symbols to determine whether the current symbol should be used in computing the time gradient. When configured with a Mueller-Muller phase detector, the timing gradient for the received signal is set to zero if the current symbol is a −2 or a +2 and the previous symbol is non-zero. Otherwise, the Mueller-Muller timing gradient is evaluated in the traditional manner. When configured with a minimum mean-squared error phase detector, the timing gradient for the received signal is set to zero if the previous symbol is non-zero. Otherwise, the minimum mean-squared error timing gradient is evaluated in the traditional manner.

In various embodiments, the disclosed techniques may be applied to improve communication links that are implemented within computer systems associated with automobiles. In one exemplary use case, an automobile could include a sensor array that gathers sensor data associated with the environment within which the automobile operates. A computer system within the automobile could transmit the sensor data across an instance of communication channel 130 to an instance of receiver 120. The instance of receiver 120 could implement the disclosed techniques to improve the accuracy and speed with which the sensor data is reconstructed following transmission across the instance of communication channel 130. The reconstructed sensor data could then be processed and/or written to memory, among other operations.

One technological advantage of the disclosed techniques relative to the prior art is that communication channel acquisition time can be reduced in partial response systems regardless of whether the target amplitude of the analog signal is predetermined in advance of communication channel acquisition. Accordingly, the communication channel can be used to transmit data sooner and therefore more effectively. Another technological advantage of the disclosed techniques is that the communication channel is more robust against various types of interference that can alter the phase and/or amplitude of the analog signal, including inter-symbol interference as well as duty-cycle distortion. These technological advantages represent one or more technological advancements relative to prior art approaches.

Referring generally to FIGS. 1A-4, transmitter 110 and/or receiver 120 can be implemented via one or more elements of an example system that is described in greater detail below in conjunction with FIGS. 5-7.

Example Hardware Architecture

Figure 5:
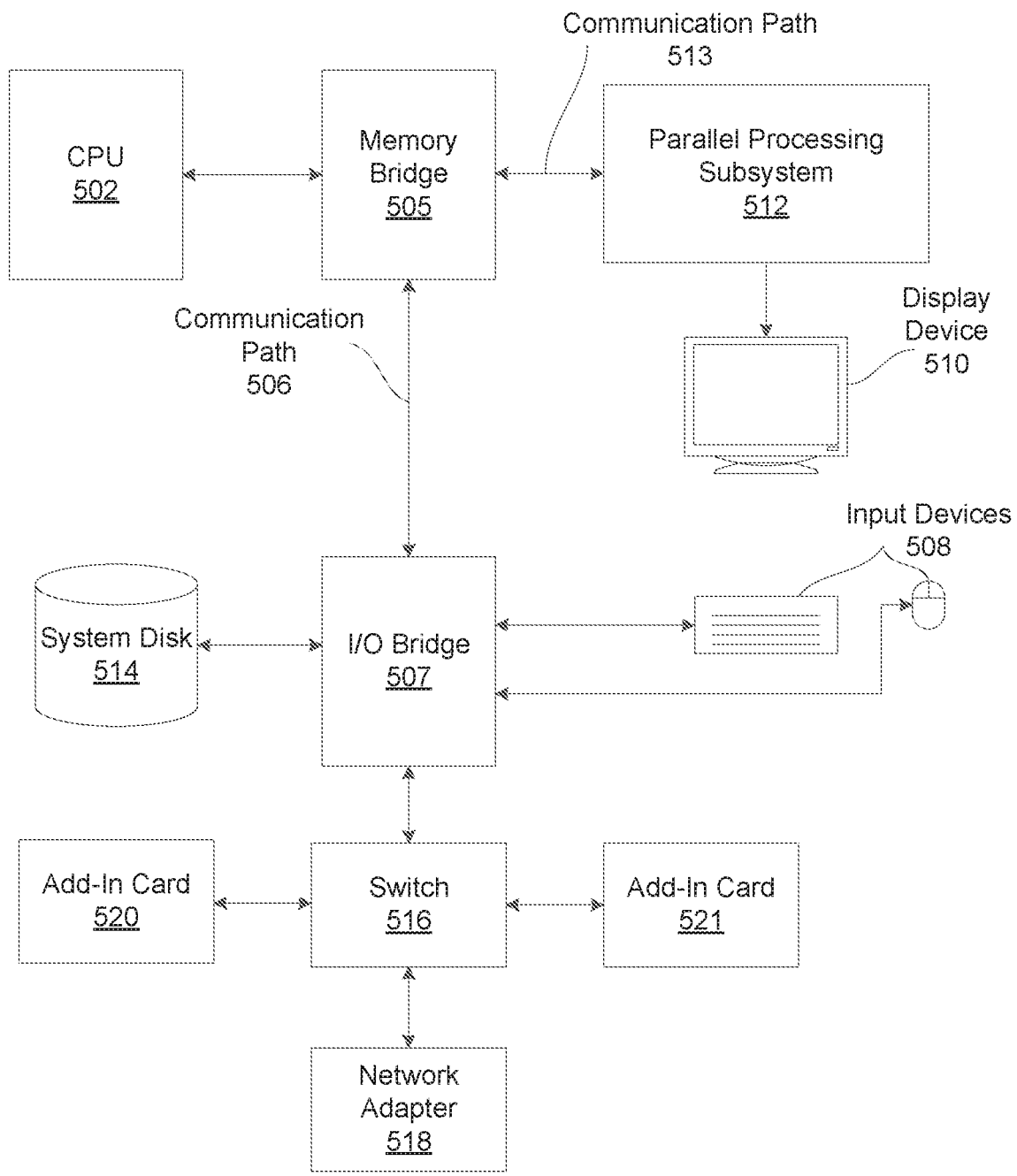
FIG. 5 is a block diagram illustrating a computer system configured to implement one or more aspects of the present embodiments.

FIG. 5 is a block diagram illustrating a computer system 500 configured to implement one or more aspects of the present embodiments. In some embodiments, computer system 500 is a server machine operating in a data center or a cloud computing environment that provides scalable computing resources as a service over a network. In one embodiment, compiler 100 and/or kernels 132 execute on one or more processors included in computer system 500.

In various embodiments, computer system 500 includes, without limitation, a central processing unit (CPU) 502 and a system memory 504 coupled to a parallel processing subsystem 512 via a memory bridge 505 and a communication path 513. Memory bridge 505 is further coupled to an I/O (input/output) bridge 507 via a communication path 506, and I/O bridge 507 is, in turn, coupled to a switch 516.

In one embodiment, I/O bridge 507 is configured to receive user input information from optional input devices 508, such as a keyboard or a mouse, and forward the input information to CPU 502 for processing via communication path 506 and memory bridge 505. In some embodiments, computer system 500 may be a server machine in a cloud computing environment. In such embodiments, computer system 500 may not have input devices 508. Instead, computer system 500 may receive equivalent input information by receiving commands in the form of messages transmitted over a network and received via the network adapter 518. In one embodiment, switch 516 is configured to provide connections between I/O bridge 507 and other components of the computer system 500, such as a network adapter 518 and various add-in cards 520 and 521.

In one embodiment, I/O bridge 507 is coupled to a system disk 514 that may be configured to store content and applications and data for use by CPU 502 and parallel processing subsystem 512. In one embodiment, system disk 514 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 507 as well.

In various embodiments, memory bridge 505 may be a Northbridge chip, and I/O bridge 507 may be a Southbridge chip. In addition, communication paths 506 and 513, as well as other communication paths within computer system 500, may be implemented using any technically suitable protocols, including, without limitation, AGP (Accelerated Graphics Port), HyperTransport, or any other bus or point-to-point communication protocol known in the art.

In some embodiments, parallel processing subsystem 512 comprises a graphics subsystem that delivers pixels to an optional display device 510 that may be any conventional cathode ray tube, liquid crystal display, light-emitting diode display, or the like. In such embodiments, the parallel processing subsystem 512 incorporates circuitry optimized for graphics and video processing, including, for example, video output circuitry. As described in greater detail below in conjunction with FIGS. 8 and 9, such circuitry may be incorporated across one or more parallel processing units (PPUs), also referred to herein as parallel processors, included within parallel processing subsystem 512. In other embodiments, the parallel processing subsystem 512 incorporates circuitry optimized for general purpose and/or compute processing. Again, such circuitry may be incorporated across one or more PPUs included within parallel processing subsystem 512 that are configured to perform such general purpose and/or compute operations. In yet other embodiments, the one or more PPUs included within parallel processing subsystem 512 may be configured to perform graphics processing, general purpose processing, and compute processing operations. System memory 504 includes at least one device driver configured to manage the processing operations of the one or more PPUs within parallel processing subsystem 512.

In various embodiments, parallel processing subsystem 512 may be integrated with one or more of the other elements of FIG. 5 to form a single system. For example, parallel processing subsystem 512 may be integrated with CPU 502 and other connection circuitry on a single chip to form a system on chip (SoC).

In one embodiment, CPU 502 is the master processor of computer system 500, controlling and coordinating operations of other system components. In one embodiment, CPU 502 issues commands that control the operation of PPUs. In some embodiments, communication path 513 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 502, and the number of parallel processing subsystems 512, may be modified as desired. For example, in some embodiments, system memory 504 could be connected to CPU 502 directly rather than through memory bridge 505, and other devices would communicate with system memory 504 via memory bridge 505 and CPU 502. In other embodiments, parallel processing subsystem 512 may be connected to I/O bridge 507 or directly to CPU 502, rather than to memory bridge 505. In still other embodiments, I/O bridge 507 and memory bridge 505 may be integrated into a single chip instead of existing as one or more discrete devices. Lastly, in certain embodiments, one or more components shown in FIG. 5 may not be present. For example, switch 516 could be eliminated, and network adapter 518 and add-in cards 520, 521 would connect directly to I/O bridge 507.

Figure 6:
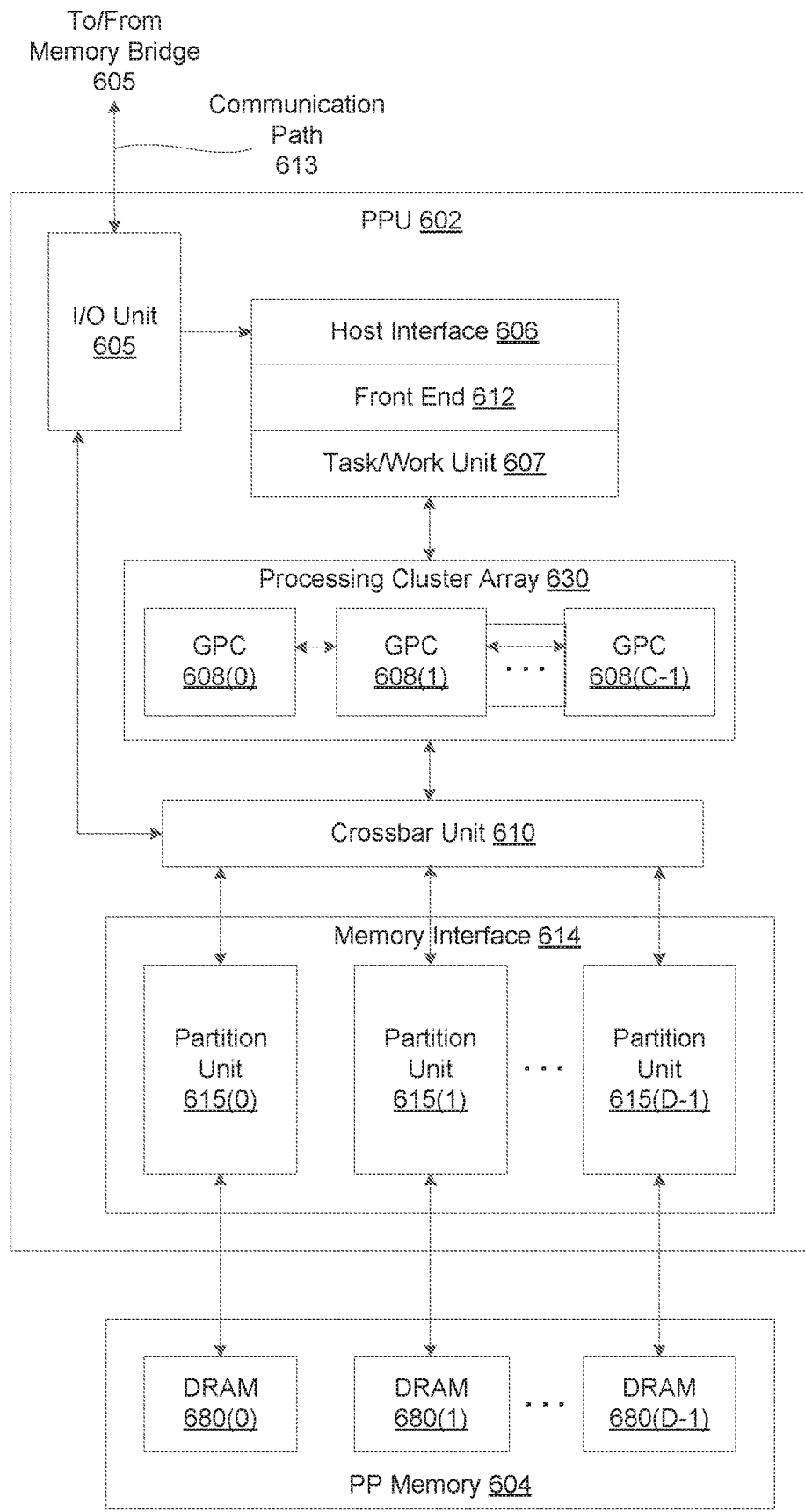
FIG. 6 is a block diagram of a parallel processing unit (PPU) included in the parallel processing subsystem of FIG. 5, according to various embodiments.

FIG. 6 is a block diagram of a parallel processing unit (PPU) 602 included in the parallel processing subsystem 512 of FIG. 5, according to various embodiments. Although FIG. 6 depicts one PPU 602, as indicated above, parallel processing subsystem 512 may include any number of PPUs 602. As shown, PPU 602 is coupled to a local parallel processing (PP) memory 604. PPU 602 and PP memory 604 may be implemented using one or more integrated circuit devices, such as programmable processors, application specific integrated circuits (ASICs), or memory devices, or in any other technically feasible fashion.

In some embodiments, PPU 602 comprises a graphics processing unit (GPU) that may be configured to implement a graphics rendering pipeline to perform various operations related to generating pixel data based on graphics data supplied by CPU 502 and/or system memory 504. When processing graphics data, PP memory 604 can be used as graphics memory that stores one or more conventional frame buffers and, if needed, one or more other render targets as well. Among other things, PP memory 604 may be used to store and update pixel data and deliver final pixel data or display frames to an optional display device 510 for display. In some embodiments, PPU 602 also may be configured for general-purpose processing and compute operations. In some embodiments, computer system 500 may be a server machine in a cloud computing environment. In such embodiments, computer system 500 may not have a display device 510. Instead, computer system 500 may generate equivalent output information by transmitting commands in the form of messages over a network via the network adapter 518.

In some embodiments, CPU 502 is the master processor of computer system 500, controlling and coordinating operations of other system components. In one embodiment, CPU 502 issues commands that control the operation of PPU 602. In some embodiments, CPU 502 writes a stream of commands for PPU 602 to a data structure (not explicitly shown in either FIG. 5 or FIG. 6) that may be located in system memory 504, PP memory 604, or another storage location accessible to both CPU 502 and PPU 602. A pointer to the data structure is written to a command queue, also referred to herein as a pushbuffer, to initiate processing of the stream of commands in the data structure. In one embodiment, the PPU 602 reads command streams from the command queue and then executes commands asynchronously relative to the operation of CPU 502. In embodiments where multiple pushbuffers are generated, execution priorities may be specified for each pushbuffer by an application program via device driver to control scheduling of the different pushbuffers.

In one embodiment, PPU 602 includes an I/O (input/output) unit 605 that communicates with the rest of computer system 500 via the communication path 513 and memory bridge 505. In one embodiment, I/O unit 605 generates packets (or other signals) for transmission on communication path 513 and also receives all incoming packets (or other signals) from communication path 513, directing the incoming packets to appropriate components of PPU 602. For example, commands related to processing tasks may be directed to a host interface 606, while commands related to memory operations (e.g., reading from or writing to PP memory 604) may be directed to a crossbar unit 610. In one embodiment, host interface 606 reads each command queue and transmits the command stream stored in the command queue to a front end 612.

As mentioned above in conjunction with FIG. 5, the connection of PPU 602 to the rest of computer system 500 may be varied. In some embodiments, parallel processing subsystem 512, which includes at least one PPU 602, is implemented as an add-in card that can be inserted into an expansion slot of computer system 500. In other embodiments, PPU 602 can be integrated on a single chip with a bus bridge, such as memory bridge 505 or I/O bridge 507. Again, in still other embodiments, some or all of the elements of PPU 602 may be included along with CPU 502 in a single integrated circuit or system of chip (SoC).

In one embodiment, front end 612 transmits processing tasks received from host interface 606 to a work distribution unit (not shown) within task/work unit 607. In one embodiment, the work distribution unit receives pointers to processing tasks that are encoded as task metadata (TMD) and stored in memory. The pointers to TMDs are included in a command stream that is stored as a command queue and received by the front end unit 612 from the host interface 606. Processing tasks that may be encoded as TMDs include indices associated with the data to be processed as well as state parameters and commands that define how the data is to be processed. For example, the state parameters and commands could define the program to be executed on the data. Also for example, the TMD could specify the number and configuration of the set of CTAs. Generally, each TMD corresponds to one task. The task/work unit 607 receives tasks from the front end 612 and ensures that GPCs 608 are configured to a valid state before the processing task specified by each one of the TMDs is initiated. A priority may be specified for each TMD that is used to schedule the execution of the processing task. Processing tasks also may be received from the processing cluster array 630. Optionally, the TMD may include a parameter that controls whether the TMD is added to the head or the tail of a list of processing tasks (or to a list of pointers to the processing tasks), thereby providing another level of control over execution priority.

In one embodiment, PPU 602 implements a highly parallel processing architecture based on a processing cluster array 630 that includes a set of C general processing clusters (GPCs) 608, where C≥1. Each GPC 608 is capable of executing a large number (e.g., hundreds or thousands) of threads concurrently, where each thread is an instance of a program. In various applications, different GPCs 608 may be allocated for processing different types of programs or for performing different types of computations. The allocation of GPCs 608 may vary depending on the workload arising for each type of program or computation.

In one embodiment, memory interface 614 includes a set of D of partition units 615, where D≥1. Each partition unit 615 is coupled to one or more dynamic random access memories (DRAMs) 620 residing within PPM memory 604. In some embodiments, the number of partition units 615 equals the number of DRAMs 620, and each partition unit 615 is coupled to a different DRAM 620. In other embodiments, the number of partition units 615 may be different than the number of DRAMs 620. Persons of ordinary skill in the art will appreciate that a DRAM 620 may be replaced with any other technically suitable storage device. In operation, various render targets, such as texture maps and frame buffers, may be stored across DRAMs 620, allowing partition units 615 to write portions of each render target in parallel to efficiently use the available bandwidth of PP memory 604.

In one embodiment, a given GPC 608 may process data to be written to any of the DRAMs 620 within PP memory 604. In one embodiment, crossbar unit 610 is configured to route the output of each GPC 608 to the input of any partition unit 615 or to any other GPC 608 for further processing. GPCs 608 communicate with memory interface 614 via crossbar unit 610 to read from or write to various DRAMs 620. In some embodiments, crossbar unit 610 has a connection to I/O unit 605, in addition to a connection to PP memory 604 via memory interface 614, thereby enabling the processing cores within the different GPCs 608 to communicate with system memory 504 or other memory not local to PPU 602. In the embodiment of FIG. 6, crossbar unit 610 is directly connected with I/O unit 605. In various embodiments, crossbar unit 610 may use virtual channels to separate traffic streams between the GPCs 608 and partition units 615.

In one embodiment, GPCs 608 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 602 is configured to transfer data from system memory 504 and/or PP memory 604 to one or more on-chip memory units, process the data, and write result data back to system memory 504 and/or PP memory 604. The result data may then be accessed by other system components, including CPU 502, another PPU 602 within parallel processing subsystem 512, or another parallel processing subsystem 512 within computer system 500.

In one embodiment, any number of PPUs 602 may be included in a parallel processing subsystem 512. For example, multiple PPUs 602 may be provided on a single add-in card, or multiple add-in cards may be connected to communication path 513, or one or more of PPUs 602 may be integrated into a bridge chip. PPUs 602 in a multi-PPU system may be identical to or different from one another. For example, different PPUs 602 might have different numbers of processing cores and/or different amounts of PP memory 604. In implementations where multiple PPUs 602 are present, those PPUs may be operated in parallel to process data at a higher throughput than is possible with a single PPU 602. Systems incorporating one or more PPUs 602 may be implemented in a variety of configurations and form factors, including, without limitation, desktops, laptops, handheld personal computers or other handheld devices, servers, workstations, game consoles, embedded systems, and the like.

Figure 7:
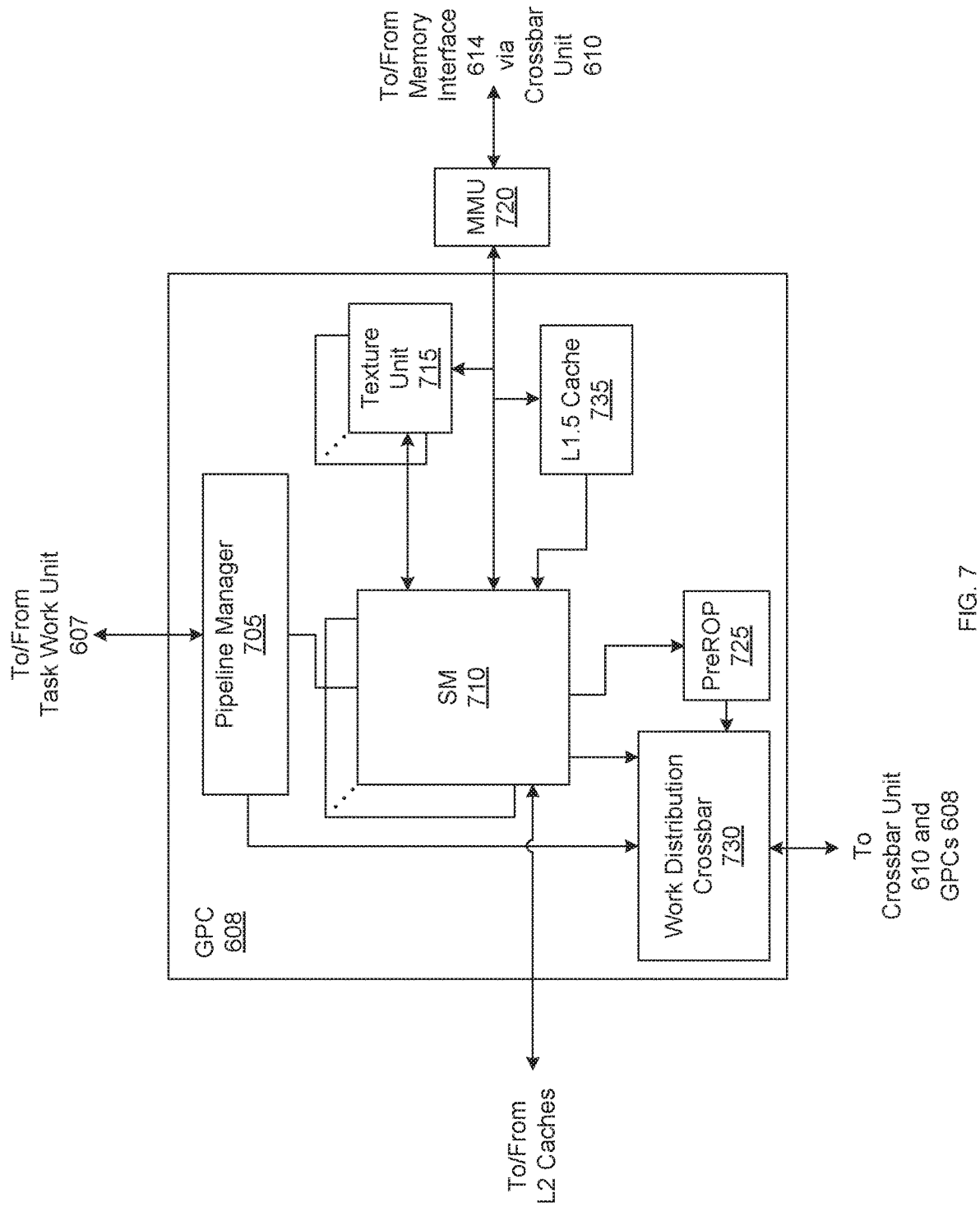
FIG. 7 is a block diagram of a general processing cluster (GPC) included in the parallel processing unit (PPU) of FIG. 6, according to various embodiments.

FIG. 7 is a block diagram of a general processing cluster (GPC) 608 included in the parallel processing unit (PPU) 602 of FIG. 6, according to various embodiments. As shown, the GPC 608 includes, without limitation, a pipeline manager 705, one or more texture units 715, a preROP unit 725, a work distribution crossbar 730, and an L1.5 cache 735.

In one embodiment, GPC 608 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 608. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 608 is controlled via a pipeline manager 705 that distributes processing tasks received from a work distribution unit (not shown) within task/work unit 607 to one or more streaming multiprocessors (SMs) 710. Pipeline manager 705 may also be configured to control a work distribution crossbar 730 by specifying destinations for processed data output by SMs 710.

In various embodiments, GPC 608 includes a set of M of SMs 710, where M≥1. Also, each SM 710 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 710 may be provided. In various embodiments, the functional execution units may be configured to support a variety of different operations including integer and floating point arithmetic (e.g., addition and multiplication), comparison operations, Boolean operations (AND, OR, 50R), bit-shifting, and computation of various algebraic functions (e.g., planar interpolation and trigonometric, exponential, and logarithmic functions, etc.). Advantageously, the same functional execution unit can be configured to perform different operations.

In one embodiment, each SM 710 is configured to process one or more thread groups. As used herein, a "thread group" or "warp" refers to a group of threads concurrently executing the same program on different input data, with one thread of the group being assigned to a different execution unit within an SM 710. A thread group may include fewer threads than the number of execution units within the SM 710, in which case some of the execution may be idle during cycles when that thread group is being processed. A thread group may also include more threads than the number of execution units within the SM 710, in which case processing may occur over consecutive clock cycles. Since each SM 710 can support up to G thread groups concurrently, it follows that up to G*M thread groups can be executing in GPC 608 at any given time.

Additionally, in one embodiment, a plurality of related thread groups may be active (in different phases of execution) at the same time within an SM 710. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 710, and m is the number of thread groups simultaneously active within the SM 710. In some embodiments, a single SM 710 may simultaneously support multiple CTAs, where such CTAs are at the granularity at which work is distributed to the SMs 710.

In one embodiment, each SM 710 contains a level one (L1) cache or uses space in a corresponding L1 cache outside of the SM 710 to support, among other things, load and store operations performed by the execution units. Each SM 710 also has access to level two (L2) caches (not shown) that are shared among all GPCs 608 in PPU 602. The L2 caches may be used to transfer data between threads. Finally, SMs 710 also have access to off-chip "global" memory, which may include PP memory 604 and/or system memory 504. It is to be understood that any memory external to PPU 602 may be used as global memory. Additionally, as shown in FIG. 7, a level one-point-five (L1.5) cache 735 may be included within GPC 608 and configured to receive and hold data requested from memory via memory interface 614 by SM 710. Such data may include, without limitation, instructions, uniform data, and constant data. In embodiments having multiple SMs 710 within GPC 608, the SMs 710 may beneficially share common instructions and data cached in L1.5 cache 735.

In one embodiment, each GPC 608 may have an associated memory management unit (MMU) 720 that is configured to map virtual addresses into physical addresses. In various embodiments, MMU 720 may reside either within GPC 608 or within the memory interface 614. The MMU 720 includes a set of page table entries (PTEs) used to map a virtual address to a physical address of a tile or memory page and optionally a cache line index. The MMU 720 may include address translation lookaside buffers (TLB) or caches that may reside within SMs 710, within one or more L1 caches, or within GPC 608.

In one embodiment, in graphics and compute applications, GPC 608 may be configured such that each SM 710 is coupled to a texture unit 715 for performing texture mapping operations, such as determining texture sample positions, reading texture data, and filtering texture data.

In one embodiment, each SM 710 transmits a processed task to work distribution crossbar 730 in order to provide the processed task to another GPC 608 for further processing or to store the processed task in an L2 cache (not shown), parallel processing memory 604, or system memory 504 via crossbar unit 610. In addition, a pre-raster operations (preROP) unit 725 is configured to receive data from SM 710, direct data to one or more raster operations (ROP) units within partition units 615, perform optimizations for color blending, organize pixel color data, and perform address translations.

It will be appreciated that the architecture described herein is illustrative and that variations and modifications are possible. Among other things, any number of processing units, such as SMs 710, texture units 715, or preROP units 725, may be included within GPC 608. Further, as described above in conjunction with FIG. 6, PPU 602 may include any number of GPCs 608 that are configured to be functionally similar to one another so that execution behavior does not depend on which GPC 608 receives a particular processing task. Further, each GPC 608 operates independently of the other GPCs 608 in PPU 602 to execute tasks for one or more application programs.

1. Some embodiments include a computer-implemented method, comprising determining that a first symbol extracted from a communication link does not meet a reliability criterion, suppressing a first computation that generates a timing gradient associated with the first symbol, in response to suppressing the first computation, performing a first operation that generates the timing gradient associated with the first symbol, and based on the timing gradient generated via the first operation, adjusting at least one parameter of an operation used to extract symbols from the communication link.

2. The computer-implemented method of clause 1, wherein determining that the first symbol does not meet the reliability criterion comprises determining that the first symbol corresponds to a non-zero value.

3. The computer-implemented method of any of clauses 1-2, wherein the first computation is implemented by a minimum mean squared-error phase detector.

4. The computer-implemented method of any of clauses 1-3, wherein determining that the first symbol does not meet the reliability criterion comprises determining that the first symbol corresponds to a non-zero value, and determining that a second symbol corresponds to a non-zero value, wherein the second symbol is extracted from the communication link prior to when the first symbol is extracted from the communication link.

5. The computer-implemented method of any of clauses 1-4, wherein the first computation is implemented by a Mueller-Muller phase detector.

6. The computer-implemented method of any of clauses 1-5, further comprising determining that a second symbol extracted from the communication link meets the reliability criterion, performing the first computation to generate a timing gradient associated with the second symbol, and based on the timing gradient associated with the second symbol, further adjusting the at least one parameter of the operation used to extract symbols from the communication link.

7. The computer-implemented method of any of clauses 1-6, further comprising determining that a link acquisition period has elapsed, extracting a plurality of symbols from the communication link, and performing the first computation based on the plurality of symbols subsequent to when the link acquisition period was determined to have elapsed.

8. The computer-implemented method of any of clauses 1-7, further comprising determining a target amplitude value for an analog signal that is transmitted via the communication link, extracting a plurality of symbols from the communication link, and performing the first computation based on the plurality of symbols subsequent to when the target amplitude value was determined.

9. The computer-implemented method of any of clauses 1-8, wherein adjusting the at least one parameter comprises modifying a sampling frequency with which the communication link is sampled.

10. The computer-implemented method of any of clauses 1-9, wherein adjusting the at least one parameter comprises modifying a sampling phase with which the communication link is sampled.

11. Some embodiments include a system, comprising a symbol qualifier that determines that a first symbol extracted from a communication link does not meet a reliability criterion, a gradient suppressor that suppresses a first computation to generate a timing gradient associated with the first symbol and, in response to suppressing the first computation, performs a first operation to generate the timing gradient associated with the first symbol, and a timing element that adjusts at least one parameter of an operation used to extract symbols from the communication link based on the timing gradient.

12. The system of clause 11, wherein the symbol qualifier determines that the first symbol does not meet the reliability criterion by determining that the first symbol corresponds to a non-zero value.

13. The system of any of clauses 11-12, wherein the first computation is implemented by a minimum mean squared-error phase detector.

14. The system of any of clauses 11-13, wherein the symbol qualifier determines that the first symbol does not meet the reliability criterion by determining that the first symbol corresponds to a non-zero value, and determining that a second symbol corresponds to a non-zero value, wherein the second symbol is extracted from the communication link prior to when the first symbol is extracted from the communication link.

15. The system of any of clauses 11-14, wherein the first computation is implemented by a Mueller-Muller phase detector.

16. The system of any of clauses 11-15, wherein the gradient suppressor performs the first operation by generating a default value for the timing gradient.

17. The system of any of clauses 11-16, wherein the default value comprises a zero value.

18. The system of any of clauses 11-17, wherein the timing element adjusts the at least one parameter by modifying a sampling frequency with which the communication link is sampled.

19. The system of any of clauses 11-18, wherein the timing element adjusts the at least one parameter by modifying a sampling phase with which the communication link is sampled.

20. Some embodiments include a computer system, comprising a communication link, and a receiver that includes a symbol qualifier that determines that a first symbol extracted from a communication link does not meet a reliability criterion, a gradient suppressor that suppresses a first computation to generate a timing gradient associated with the first symbol and, in response to suppressing the first computation, performs a first operation to generate the timing gradient associated with the first symbol, and a timing element that adjusts at least one parameter of an operation used to extract symbols from the communication link based on the timing gradient.

21. Some embodiments include a computer-implemented method, comprising suppressing a timing gradient computation associated with one or more symbols that have been extracted from a communication link and do not meet a reliability criterion, instead of performing the timing gradient computation associated with the one or more symbols, performing a timing gradient operation that generates a timing gradient for the one or more symbols, and based on the timing gradient generated via the timing gradient operation, adjusting at least one parameter of an operation used to extract symbols from the communication link.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   identifying a first symbol extracted from a communication link;
   suppressing a first computation that generates a first timing gradient associated with the first symbol;
   performing a first operation that generates a second timing gradient associated with the first symbol, wherein the second timing gradient had a different value than the first timing gradient; and
   adjusting, based on the second timing gradient generated via the first operation, at least one parameter of an operation used to extract symbols from the communication link.

2. The computer-implemented method of claim 1, further comprising determining that the first symbol corresponds to a non-zero value.

3. The computer-implemented method of claim 2, wherein the first computation is implemented by a minimum mean squared-error phase detector.

4. The computer-implemented method of claim 1, further comprising:
   determining that the first symbol corresponds to a non-zero value; and
   determining that a second symbol corresponds to a non-zero value,
   wherein the second symbol is extracted from the communication link prior to when the first symbol is extracted from the communication link.

5. The computer-implemented method of claim 4, wherein the first computation is implemented by a Mueller-Muller phase detector.

6. The computer-implemented method of claim 1, further comprising:
   identifying a second symbol extracted from the communication link;
   determining that the second symbol extracted from the communication link meets a reliability criterion;
   performing the first computation to generate a third timing gradient associated with the second symbol; and
   adjusting, based on the third timing gradient associated with the second symbol, the at least one parameter of the operation used to extract one or more symbols from the communication link.

7. The computer-implemented method of claim 1, further comprising:
   determining that a link acquisition period has elapsed;
   extracting a plurality of symbols from the communication link; and
   performing the first computation based on the plurality of symbols subsequent to when the link acquisition period was determined to have elapsed.

8. The computer-implemented method of claim 1, further comprising:
   determining a target amplitude value for an analog signal that is transmitted via the communication link;
   extracting a plurality of symbols from the communication link; and
   performing the first computation based on the plurality of symbols subsequent to when the target amplitude value was determined.

9. The computer-implemented method of claim 1, wherein adjusting the at least one parameter comprises modifying a sampling frequency with which the communication link is sampled.

10. The computer-implemented method of claim 1, wherein adjusting the at least one parameter comprises modifying a sampling phase with which the communication link is sampled.

11. A system, comprising:
    a symbol qualifier that determines that a first symbol extracted from a communication link does not meet a reliability criterion;
    a gradient suppressor that suppresses a first computation to generate a timing gradient associated with the first symbol and, in response to suppressing the first computation, performs a first operation to generate the timing gradient associated with the first symbol; and
    a timing element that adjusts at least one parameter of an operation used to extract symbols from the communication link based on the timing gradient.

12. The system of claim 11, wherein the symbol qualifier determines that the first symbol does not meet the reliability criterion by determining that the first symbol corresponds to a non-zero value.

13. The system of claim 12, further comprising a minimum mean squared-error phase detector that implements the first computation.

14. The system of claim 11, wherein the symbol qualifier determines that the first symbol does not meet the reliability criterion by:
    determining that the first symbol corresponds to a non-zero value; and
    determining that a second symbol corresponds to a non-zero value, wherein the second symbol is extracted from the communication link prior to when the first symbol is extracted from the communication link.

15. The system of claim 14, further comprising a Mueller-Muller phase detector that implements the first computation.

16. The system of claim 11, wherein the gradient suppressor performs the first operation by generating a default value for the timing gradient.

17. The system of claim 16, wherein the default value comprises a zero value.

18. The system of claim 11, wherein the timing element adjusts the at least one parameter by modifying a sampling frequency with which the communication link is sampled.

19. The system of claim 11, wherein the timing element adjusts the at least one parameter by modifying a sampling phase with which the communication link is sampled.

20. A computer system, comprising:
a communication link; and
a receiver that includes:
- a symbol qualifier that determines that a first symbol extracted from a communication link does not meet a reliability criterion,
- a gradient suppressor that suppresses a first computation to generate a timing gradient associated with the first symbol and, in response to suppressing the first computation, performs a first operation to generate the timing gradient associated with the first symbol, and
- a timing element that adjusts at least one parameter of an operation used to extract symbols from the communication link based on the timing gradient.

21. A computer-implemented method, comprising:
suppressing a timing gradient computation associated with one or more symbols that have been extracted from a communication link and do not meet a reliability criterion, wherein the timing gradient computation generates a first timing gradient;
performing a timing gradient operation that generates a second timing gradient for the one or more symbols; and
adjusting, based on the second timing gradient generated via the timing gradient operation, at least one parameter of an operation used to extract symbols from the communication link.

* * * * *